July 30, 1935. P. L. STENMAN 2,009,751
SCREW MACHINE SUPPLYING MECHANISM
Filed June 14, 1933
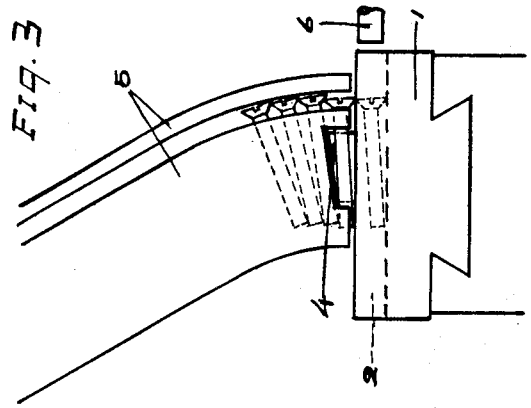
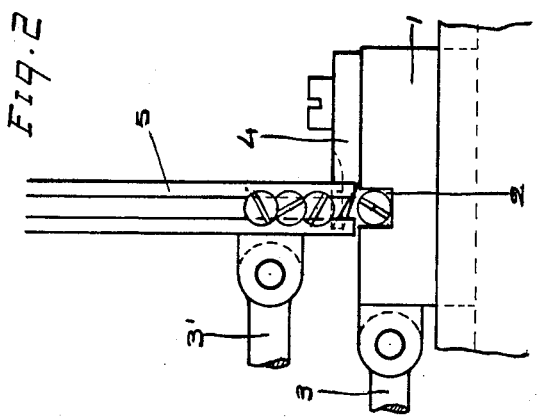
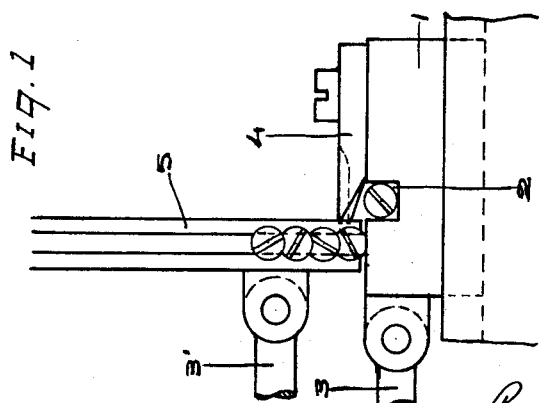

Patented July 30, 1935

2,009,751

UNITED STATES PATENT OFFICE 2,009,751

SCREW MACHINE SUPPLYING MECHANISM

Per Leonard Stenman, Stockholm, Sweden

Application June 14, 1933, Serial No. 675,814
In Sweden June 14, 1932

1 Claim. (Cl. 10—162)

This invention relates to an improvement in a supplying machine device and has for one of its principal objects the supplying of screw blanks or the like in a screw machine or rivet machine or the like.

Another object of the said mechanism is to separate the screw blanks or the like in a proper manner.

Another object of the said mechanism is to push the blanks down in a recess or slot with high speed.

And still another object of said invention is to provide means for preventing disturbance in the feeding of the blanks.

Other and further important objects of the invention will be apparent in the accompanying drawing and following specification.

The invention, in a preferred form, is illustrated in the drawing and hereinafter more fully described.

In the drawing:

Fig. 1 is a side elevation of the mechanism, showing the feeding guide leading from the hopper (not shown), the separator and the receiving plate.

Fig. 2 is the same as Fig. 1 but in different position.

Fig. 3 is an end view of Fig. 1.

As shown in the drawing:

The reference numeral 1 indicates generally a sliding plate with a dovetail guide, best shown in Fig. 3. A recess or slot 2 is provided in the top side of said plate. The slot is to receive the blanks for further delivery. Numeral 3 is an operating rod pivotally connected to plate 1. A separating device 4 is mounted on plate 1 in an adjustable manner to accommodate different sizes of blanks. The feeding magazine guide way 5 is shown at one side of slot 2 in Fig. 1, and in Fig. 2 directly over the slot 2. The guide way 5 is operated in a back and forth manner by connecting rod 3'. Numeral 6 is a pushing rod feeding the blank to a chuck, not shown.

As shown in Fig. 1 the blanks are fed in the magazine guide way 5. By oscillating the plate 1 or the guide way 5, or both, at the same time, member 4 will separate the blanks and push one at a time down in slot 2. Member 4 is wedge-shaped as shown in Fig. 1 and also wedge-shaped as shown in Fig. 3. Said shape is necessary in order to contact with the sides of the blanks as they gravitate successively down the guide way which blanks are of the headed type and therefore lie in the guide way in a slanting position, as shown particularly in Fig. 3. In order to receive the wedge-shaped member 4 a slot is also provided in the lower end of guide way 5.

When separating member 4 goes between the lowermost blank and the next to that which latter at that moment rests on a sloping upper plane of member 4. The sharp wedged lower edge on member 4 pushes the lowermost blank down in slot 2. Said edge face is here shown with a straight edge, but its surface can also be of a curved or other bevelled shape.

When the separating device 4 enters between the lowermost blank and the next adjacent, this latter one and the remaining blanks in the guide 5 are brought to rest on the sloping upper plane surface of member 4, whereby the lowermost one is disengaged from the other blanks and can without disturbance be pushed into the slot 2 by the edge of member 4. Said edge face is here shown with a straight surface, but it can also be of a curved nature.

I am aware that many changes may be made and numerous details of construction varied throughout a wide range without departing from the principles of this invention, and I therefore do not purpose limiting the patent granted hereon otherwise than as necessitated by prior art.

I claim as my invention:

A mechanism for supplying cylindrical headed-blanks to machines comprising an upright magazine guide way having a notch or slot in one of its side walls at its lower, feed end, a sliding plate provided with a blank-receiving recess and carrying a separating plate whose forward edge is adapted to enter the aforesaid notch or slot in the magazine wall, and means for relatively reciprocating said magazine feed guide and said sliding plate, the entering edge of said separating plate having two bevelled surfaces, one facing downwardly to push the lowermost blank down into said recess and the other facing upwardly to serve as a rest for the blank next to the lowermost blank during the separating operation.

PER LEONARD STENMAN.